Figure 1:
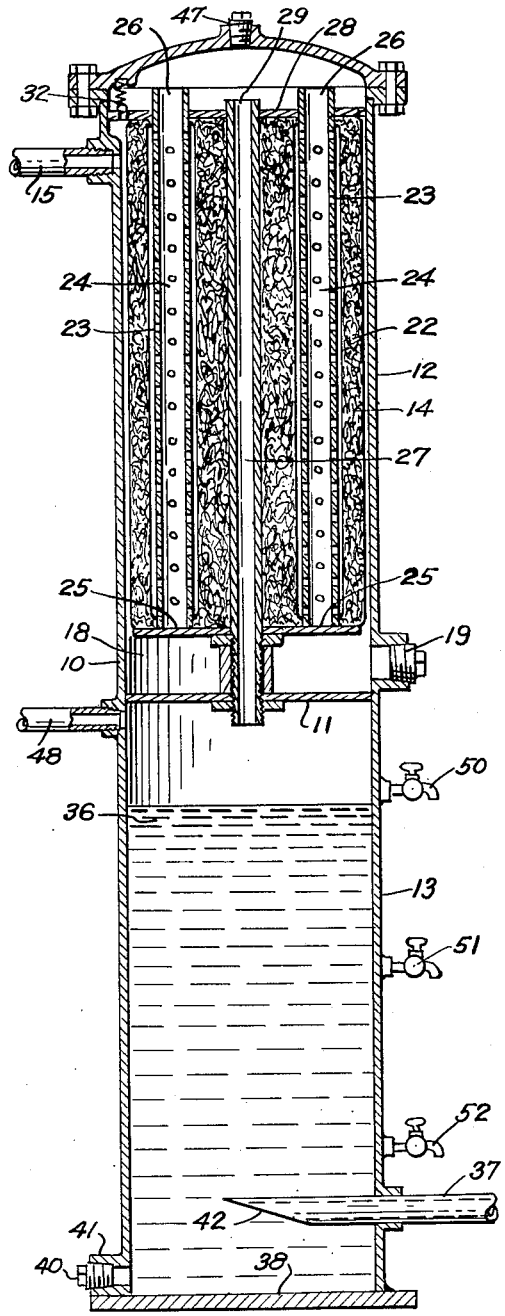

June 10, 1952 C. A. WINSLOW ET AL 2,599,734
FILTER
Filed Sept. 24, 1946

INVENTORS
CHARLES A. WINSLOW
WILLIAM G. NOSTRAND
BY LAURENCE L. MOORE

ATTORNEY

Patented June 10, 1952

2,599,734

UNITED STATES PATENT OFFICE 2,599,734

FILTER

Charles A. Winslow, William G. Nostrand, and Laurence L. Moore, Oakland, Calif., assignors to Winslow Engineering Co., Oakland, Calif., a partnership Application September 24, 1946, Serial No. 699,010

4 Claims. (Cl. 210—122.5)

This invention relates to a fluid cleaning system, especially to an oil cleaning system for a dry sump engine.

A typical dry sump lubricating system employs two pumps: a pressure pump to push the lubricant to the bearings under pressure, and a scavenger pump which keeps the crank case of the engine relatively dry and forces the oil through a filter or oil cleaning system and back to the fresh oil lubricant supply reservoir.

One object of this invention is to provide an oil cleaning system particularly applicable where space is at a premium as on a boat or in a railroad car.

Another object of this invention is to provide a clean oil storage system in conjunction with a filter to provide clean oil and at the same time insure against flooding the engine crankcase with oil from the filter when the engine stops.

Another object of the invention is to reduce the number of units in the lubricating system by having the oil cleaning system include the oil storage reservoir and the oil cooling system. It is contemplated that the invention will find particular applicability on railroad engines with narrow spaces for filter installations, or on small boats such as fish boats, where the quarters are cramped.

Another object of the invention is to provide an oil purifying system having provision for de-aerating the oil.

Another object of the invention is to provide a filter assembly which is easily cleaned as a unit.

Other objects and uses of the invention will appear from the description below.

Figure 2:
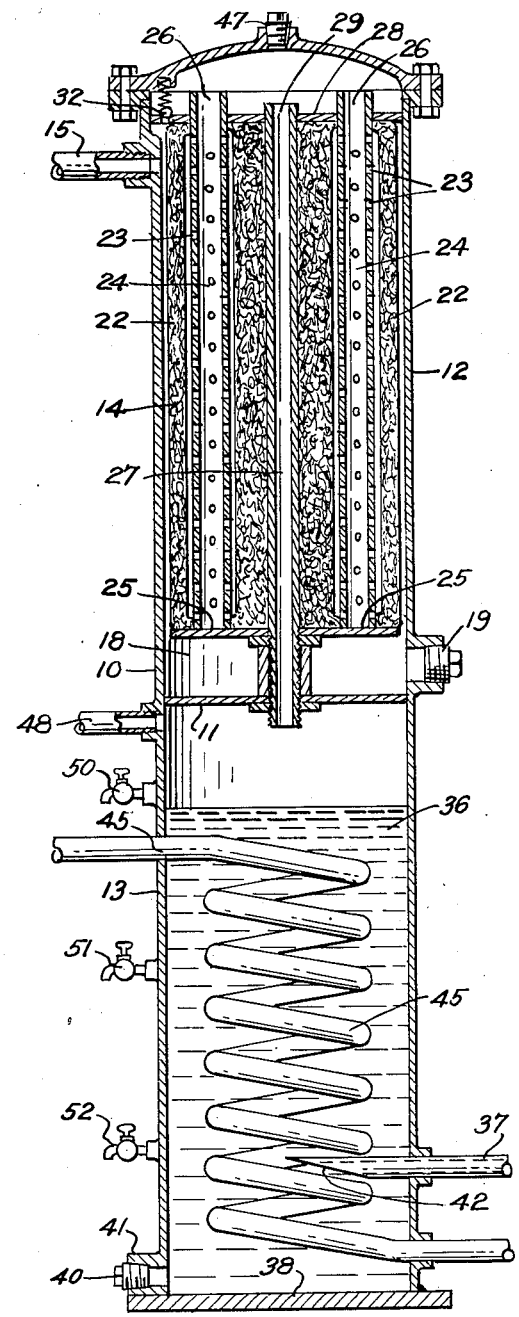

In the drawings:

Fig. 1 is a vertical elevation in cross-section showing a preferred form of the device, and Fig. 2 is a similar view of a modification.

As shown in the drawings, the housing 10 of the oil cleaning system is divided at approximately its center by a partition 11, forming an upper chamber 12 and a lower chamber 13. The upper chamber 12 houses a filter 14 of the type described in our co-pending application, Serial No. 697,222, filed September 16, 1946, now Patent No. 2,565,445, August 21, 1951, in which the operation of the filter is clearly explained.

The dirty oil which has been raised from the sump by a scavenger pump, not shown, enters the oil cleaning system at the opening 15. The sludge has an opportunity to settle into the sludge basin 18 and can be removed through the sludge drain 19. In the meantime the pressure from the scavenger pump is forcing the oil through the filtering material 22, through the perforations 23, and into a tube 24. Since the tubes 24 are closed at the lower end by a first horizontal partition 25, the oil must empty from the open ends 26 at the top of the tubes 24.

All the tubes 24 and the conduit 27 have their openings above the floor or second horizontal partition 28, the opening 29 in the conduit 27 being somewhat lower than the openings 26. The by-pass valve 32 permits the fluid to pass directly through the floor or second horizontal partition 28 without going through the filter 14 when a predetermined critical pressure is reached, so that the lubricating system will still circulate the oil even if the filter material 22 becomes plugged with sludge. The dirty oil by-passed through the valve 32, after having had some chance to drop its sludge into the sludge basin 18, is given a second opportunity to drop its sludge, which can settle onto the floor or second horizontal partition 28 below the opening 29 in the conduit 27.

The oil passing through the conduit 27 empties directly into the oil reservoir 36, contained in the lower chamber 13 of the housing 10. The straight-through passage provided by conduit 27 prevents the plugging which is likely to occur in a winding pipeway outlet, or one in which a portion is horizontal.

Since the outlet 37 is somewhat above the bottom 38 of the reservoir 36, a third settling basin for gravity cleaning of the oil is provided, and sludge may be removed by withdrawing the plug 40 from the drain 41. The outlet 37 is kept free from settling sludge by a shield 42 formed by the angle cut of the outlet pipe 37, so that even if all the oil should be by-passed through the valve 32, it still will be much cleaner and therefore less abrasive than if it were not sent through the oil cleaning system.

As shown in Fig. 2, a coil 45 can pass into the reservoir 36, and a stream of cold water sent through the coil 45 to cool the clean lubricating oil. In that device a great saving of space and an increase of efficiency is obtained, for the oil cleaning system then renders unnecessary a separate cooling tank and a separate storage tank.

In order to prevent the development of differential pressure within the oil-cleaning system, the air vents 47 and 48 are provided in the housing 10. Another purpose served by these air vents 47 and 48 is the de-aeration of the oil. Air which becomes separated from the oil during filtering seeps up into the hollow space in the cap and thence out the vent 47, while the air vent 48 serves a similar function of getting rid of air which separates from the clean oil during storage, shown at 36.

At several levels along the reservoir 36 may be placed the stop cocks 50, 51 and 52 which can be used for determining the oil level inside the reservoir 36 and also to drain off clean oil above the outlet 37, in case a great deal of sludge has settled into the reservoir 36.

By this type of device the complete system of filtering, cooling, and storing the lubricating oil of a dry sump engine is combined into one unit. The whole assembly takes much less space than three units would require, and also does away with the connections between the units. The assembly may be removed as a unit for repair or replacement and may be installed in an engine which has very little available space.

Because of the location of the inlet 15 and the other features described, this system is especially useful in dry sump engines. It will not drain and flood the engine when pressure ceases, and will supply clean oil, free from foaming, to the engine.

It is understood that changes may be made in sizes, shapes, materials and arrangements of the parts without departing from the spirit of the invention or from the claims below.

What is claimed is:

1. A fluid purifying system comprising: a single casing having an upper open end, an inlet adjacent thereto, a lower closed end, and an outlet above said lower end; a normally closed drain opening below said outlet; a first horizontal partition dividing said casing into an upper, filtering portion and a lower, clean-fluid reservoir, said partition having a central opening therein; a vertical conduit secured to said partition around said opening and extending vertically upward therefrom; a hollow, removable cap closing the upper end of said casing; a second horizontal partition across said casing, spaced away from and below said cap, said conduit extending into the hollow space between said second partition and said cap; filtering means between said first and second partitions and spaced substantially from the walls of said casing for filtering fluid in said upper portion and passing it up into said hollow space, said means being positioned above said first partition to provide a sump where sludge settles; and a normally closed drain opening at the bottom of said sump.

2. A fluid purifying system for a dry sump engine including in combination a single casing having an upper open end, an inlet adjacent thereto, a lower closed end, and an outlet about said lower end; a first horizontal partition dividing said casing into an upper filtering portion and a lower clean-fluid reservoir, said partition having a central opening therethrough; a vertical conduit secured to said partition around said opening and extending vertically upward therefrom; a hollow removable cap closing the upper end of said casing; a second horizontal partition across said casing, spaced away from and below said cap, said conduit extending into the hollow space between said second partition and said cap to provide a settling zone between said second partition and the upper open end of said conduit; filtering means between said first partition and said second partition and spaced substantially from the sides of said casing, for filtering fluid in said upper portion, said filtering means being positioned above said first partition and spaced therefrom to provide a sump for the settling of sludge out of said fluid; outlet means from said filtering means extending a substantial distance above said second partition; and a normally closed by-pass valve responsive to a predetermined fluid pressure for opening and passing fluid from said upper filtering portion of said casing into the hollow space between said second partition and said cap, said settling zone in said hollow space then serving to remove at least a portion of sludge from said by-passed fluid.

3. A fluid purifying system comprising: a single casing having an upper open end, an inlet adjacent thereto, a lower closed end, and an outlet above said lower end; a first horizontal partition dividing said casing into an upper, filtering portion and a lower, clean fluid reservoir, said partition having a central opening therein; a vertical conduit secured to said partition around said opening and extending vertically upward therefrom; a hollow, removable cap closing the upper end of said casing; a second horizontal partition across said casing, spaced away from and below said cap, said conduit extending into the hollow space between said second partition and said cap; and filtering means between said first and second partitions and spaced substantially from the sides of said casing for filtering fluid in said upper portion and having outlet means for passing said filtered fluid up into said hollow space, said filtering means being positioned above said first partition to provide a sump where sludge settles, said conduit and said outlet-means of said filtering means both extending substantially above said second partition to provide a settling zone there.

4. A fluid purifying system for a dry sump engine, including in combination, a single casing having an upper open end, an inlet adjacent thereto, a lower closed end, a normally closed drain opening immediately above said lower closed end whereby sludge may be drained therefrom, and an outlet tube located a substantial distance above said drain opening and extending through said casing, said outlet tube being shielded on its inner end so that it draws out fluid only from a portion of its lower side and thereby only admits a minimum amount of the settling sludge in said reservoir; a first horizontal partition between said outlet and said inlet dividing said casing into an upper filtering portion and a lower clean-fluid reservoir, said partition having a central opening therethrough; an air vent opening through the lower portion of said casing to prevent differential pressure from building up on opposite sides of said partition and to deaerate the fluid; a hollow removable cap closing the upper end of said casing; a second horizontal partition across said casing, spaced away from and below said cap to provide a hollow space therebetween, said cap having an air vent opening therein to prevent differential pressure from building up on the opposite sides of said second partition and to de-aerate said fluid; a vertical conduit passing through said first partition opening and secured to said first partition around said opening and extending vertically upward therefrom into the hollow space between said second partition and said cap a substantial distance above said second partition, to provide a settling zone between said second partition and the upper open end of said conduit; filtering means between said first partition and said second partition and spaced substantially from the sides of said casing, for filtering fluid in said upper filtering portion, said filtering means being positioned above said first partition and spaced therefrom to provide a sump for the settling of sludge out of said fluid; a normally-closed drain opening in said casing immediately above said first partition for draining sludge from said sump; outlet-means for said filtering means extending upwardly a substantial distance above said second partition, higher than said conduit extends above said second partition; a normally closed by-pass valve responsive to a predetermined pressure for opening and passing fluid from said upper filtering portion into said settling zone above said second partition; and temperature control means in said clean-fluid reservoir, whereby a complete fluid purification and cooling system is provided in one housing, with three sludge-settling areas in said unit, so that considerable sludge is removed even from by-passed fluid.

CHARLES A. WINSLOW.
WILLIAM G. NOSTRAND.
LAURENCE L. MOORE.

REFERENCES CITED

The following references are of record in the file of this patent:

UNITED STATES PATENTS

| Number | Name | Date |
|---|---|---|
| 767,808 | Rorbes | Aug. 16, 1904 |
| 1,190,538 | Carrity et al. | July 11, 1916 |
| 1,246,850 | Best | Nov. 20, 1917 |
| 1,733,031 | Smith | Oct. 22, 1929 |
| 1,851,172 | Gordon | Mar. 29, 1932 |
| 1,951,809 | Renfrew | Mar. 20, 1934 |
| 2,027,876 | Pennebaker | Jan. 14, 1936 |
| 2,106,218 | Krieck | Jan. 25, 1938 |
| 2,167,225 | Van Eweyk | July 25, 1939 |
| 2,203,668 | Burckhalter | June 11, 1940 |
| 2,219,101 | Finwall | Oct. 22, 1940 |
| 2,323,152 | Metcalf | June 29, 1943 |
| 2,374,976 | Briggs et al. | May 1, 1945 |
| 2,390,494 | Briggs et al. | Dec. 11, 1945 |
| 2,429,321 | La Brecque | Oct. 21, 1947 |

FOREIGN PATENTS

| Number | Country | Date |
|---|---|---|
| 13,029 | Great Britain | 1890 |
| 326,097 | France | Nov. 4, 1902 |
| 2,907 | Germany | Mar. 2, 1878 |